United States Patent [19]

Gotoh et al.

[11] Patent Number: 5,060,098
[45] Date of Patent: Oct. 22, 1991

[54] MAGNETIC RECORDER PROVIDED WITH A MAGNETIC HEAD SLIDER HAVING A NON-MAGNETIC OXIDE OF SPINEL STRUCTURE

[75] Inventors: Akihiro Gotoh; Shinsuke Higuchi; Takeshi Miyazaki; Kunihiro Maeda, all of Hitachi; Yokuo Saitoh, Kanagawa; Toyoji Okuwaki, Tokyo; Noriaki Okamoto; Kousaku Wakatsuki, both of Ibaraki, all of Japan

[73] Assignee: Hitachi, Ltd., Tokyo, Japan

[21] Appl. No.: 339,490

[22] Filed: Apr. 17, 1989

[30] Foreign Application Priority Data

Apr. 18, 1988 [JP] Japan .................................. 63-93532
Sep. 14, 1988 [JP] Japan ................................ 63-228830

[51] Int. Cl.$^5$ ....................... G11B 5/187; C04B 35/56; C04B 35/10
[52] U.S. Cl. .................................... 360/103; 360/122; 501/87
[58] Field of Search .................... 360/103, 122; 501/87

[56] References Cited

U.S. PATENT DOCUMENTS

| | | | |
|---|---|---|---|
| 4,251,841 | 2/1981 | Jacobs ................................. | 360/103 |
| 4,582,812 | 4/1986 | Furukawa et al. ................... | 360/103 |
| 4,598,052 | 7/1986 | Wada et al. .......................... | 360/103 |
| 4,650,774 | 3/1987 | Kawaguchi et al. ................. | 501/87 |
| 4,681,813 | 7/1987 | Yamada et al. ...................... | 360/122 |
| 4,709,284 | 11/1987 | Endo et al. ........................... | 360/103 |
| 4,796,127 | 1/1989 | Wada et al. .......................... | 360/103 |
| 4,805,059 | 2/1989 | Tsuchiya et al. .................... | 360/103 |
| 4,835,640 | 5/1989 | Endo et al. ........................... | 360/103 |
| 4,902,651 | 2/1990 | Wada et al. .......................... | 501/87 |

FOREIGN PATENT DOCUMENTS 0096521 6/1984 Japan .
0183709 9/1985 Japan .

Primary Examiner—John H. Wolff
Assistant Examiner—Craig A. Renner
Attorney, Agent, or Firm—Antonelli, Terry, Stout & Kraus

[57] ABSTRACT

The present invention provides; a magnetic disk recorder comprising (i) magnetic disks having magnetic recording media, (ii) thin-film magnetic heads for recording information in the recording media and reproducing information therefrom, and (iii) a carriage for moving the magnetic heads to intended positions, the recorder being wherein the thin-film magnetic heads are formed on sliders and these sliders comprise sintered bodies containing a non-magnetic metal oxide of spinel structure and harder ceramic particles than the metal oxide which are dispersed in the metal oxide; a sintered body useful particularly as a material for the magnetic head slider, a method for making the sintered body, and a magnetic head and a magnetic head slider, for recording and reproducing information, which are made by using the sintered body.

5 Claims, 5 Drawing Sheets

MAGNETIC RECORDER PROVIDED WITH A MAGNETIC HEAD SLIDER HAVING A NON-MAGNETIC OXIDE OF SPINEL STRUCTURE

BACKGROUND OF THE INVENTION

1. Field of the Invention

The present invention relates to a novel magnetic recorder and particularly to a sintered body useful as a magnetic head slider for said recorder and further relates to a method for making said sintered body, to a magnetic head for recording and reproduction wherein said sintered body is used as its slider, and to such a magnetic head slider.

2. Description of the Prior Art

In the field of magnetic recording disks, there are needs for higher density recording of data and for quick and accurate reading-out of recorded data, since techniques of data processing have been advanced in recent years Therefore the method of using thin-film magnetic head sliders in the C.S.S. states is adopted extensively. The term "C.S.S." is an abbreviation of contact.start.-stop, meaning the states of a head slider that, when the disk is at a stop, is rested on the disk and when the disk is under revolution, is kept floating by the air bearing effect so as not to be in contact with the disk.

The following describes the structure and operation of a magnetic disk device fitted for such a method.

Structure: A number (6–12) of magnetic disks are fitted each around a rotary shaft, while magnetic head sliders are fixed on head arms through gimbals in the form of plate springs for pressing the sliders against the disks. Each head arm is fixed on a carriage which is installed to move the sliders toward the rotary shaft. Two head sliders are fixed on each head arm, one of these sliders being pressed to contact with the lower side of the overlying disk and the other being pressed to contact with the upper side of the underlying disk, by the plate-spring action of the gimbals.

Operation: The operation is begun with starting the revolution of disks by driving the rotary shaft with a motor. Upon arrival at a definite revolution, the sliders pressed against the disk surfaces are detached therefrom by the air bearing effect. In this condition, the carriage is moved to carry the sliders to definite positions, and information is written in or read out by switching at or from a prescribed position on a definite disk. Thus the magnetic recorder performs its duty.

According to such a system as described above, the sliders, just after start of the disk revolution and just before stop of the disk revolution, slide (relatively to the disks) while colliding lightly with the disks (slide in a collision mode), as observed microscopically.

Up to now, a number of materials for magnetic heads have been proposed in documents, e.g. Japanese Patent Application Kokai (Laid-open) No. 55-163665, No. 59-96521, and No. 60-183709.

However, none of the hitherto proposed magnetic head materials are considered in relation to the above stated slide in a collision mode: there is the problem of short slide life in all the proposed head materials. When the slide life is short, information writing or reading becomes impossible in a short time and in addition stored information disappears simultaneously. Hence the reliability of products from such materials is remarkably low.

Regarding, on the other hand, magnetic head sliders which slide constantly as in the operation of magnetic tape recorders, materials hitherto proposed for sliders are not adequate to satisfy requirements with respect to abrasion resistance and some other performance characteristics.

SUMMARY OF THE INVENTION

Objects of the present invention are to provide magnetic recorders which solve the above noted problems of the prior art, to provide magnetic head sliders for use in such recorders, and to provide sintered bodies fitted for the sliders.

An aspect of this invention is a magnetic disk recorder equipped with (i) magnetic disks having magnetic recording media, (ii) thin-film magnetic heads for recording information in said magnetic recording media and reproducing information therefrom, and (iii) a carriage for moving said magnetic heads to intended positions, wherein said thin-film magnetic heads are formed on sliders and these sliders comprise sintered bodies containing a non-magnetic metal oxide of spinel structure and harder ceramic particles than the metal oxide which are dispersed in the oxide.

The magnetic disk recorder of this invention is characterized in that said thin-film magnetic heads are formed on said sliders, which comprise a non-magnetic metal oxide of spinel structure and particles of non-oxide-type metal compound dispersed in the metal oxide, said particles being not substantially oxidized at service temperatures; that said thin-film magnetic heads are formed on said sliders, which comprise a non-magnetic $MR_2O_4$-type oxide (M denotes a divalent metal and R denotes a trivalent metal) of spinel structure and particles of non-oxide-type metal compound dispersed in the metal oxide, said particles being higher in Young's modulus than the metal oxide and not substantially oxidized at service temperatures; that said thin-film magnetic heads are formed on said sliders, which comprise sintered bodies containing a non-magnetic metal oxide of spinel structure and 3–50% by volume of non-oxide-type ceramic particles dispersed in the metal oxide which are harder than the metal oxide and not substantially oxidized at service temperatures; and that said thin-film magnetic heads are formed on said sliders, which are composed of (a) a spinel-structured oxide of (i) at least one metal selected from Ca, CU, Ba, Mg, Ni, Mn, Co, and Zn and (ii) at least one metal selected from Al, Cr and Fe and (b) 3–50% by volume of particles and/or whiskers of at least one of SiC, ZrC, HfC, VC, NbC, and TiC, said particles and/or whiskers being dispersed in the oxide.

Another aspect of this invention is a slider which is provided with sliding-directional grooves in the sliding surface and with a pair of thin-film magnetic heads at either end surface of the groove portion and comprise a sintered body which contains a non-magnetic metal oxide of spinel structure and harder ceramic particles than the metal oxide which are dispersed in the oxide.

Another aspect of this invention is the above specified sintered body.

The sintered body of this invention comprise a dispersion of ceramic material in a non-magnetic oxide of the spinel structure $MR_2O_4$ (wherein, M is a divalent metal and R is a trivalent metal), said ceramic material being higher in Young's modulus than said oxide and not substantially oxidized at service temperatures.

Another aspect of this invention is a method for making sintered bodies which comprises sintering an $MR_2O$-type oxide, which is an ingredient, and a ceramic material stated above at temperature where they do not substantially react together.

DETAILED DESCRIPTION OF THE INVENTION

Figure 1:
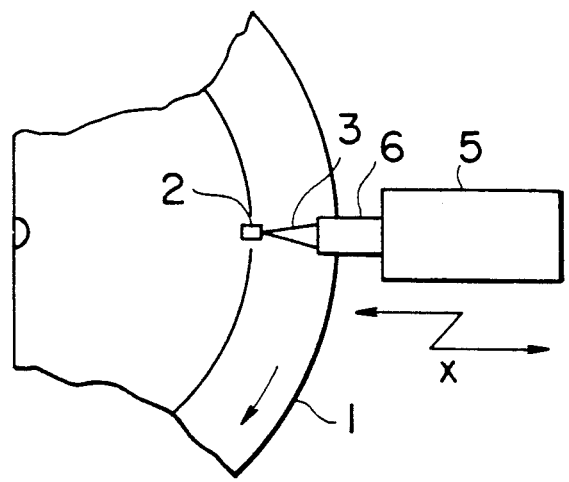
FIG. 1 is a partial plan view of a magnetic recorder according to this invention.

The sintered body of this invention has been developed for use in such magnetic recorders as stated above, particularly for use as a material for magnetic head sliders. For the purpose of improving the tenacity at break of conventional materials having spinel structure, various ceramic materials were dispersed in metal oxides of spinel structure by a known dispersion method. As a result, ceramic materials higher in Young's modulus than the main ingredient oxide were found as promising ingredients. But it was also found that certain ceramic materials were oxidized at operation temperatures of a magnetic head slider, undergoing deterioration in abrasion resistance. According to present inventors' experiments, it has been confirmed that the surface temperature of magnetic head slider during oepration reaches about 700° C. The high-temperature oxidation resistance of a ceramic material for use as an ingredient of the sintered body according to this invention means the non-oxidizability even at such a high operation temperature of a magnetic head slider.

Accordingly, an example of suitable ceramic materials for the sintered body according to this invention is at least one carbide selected from the group consisting of SiC, ZrC, HfC, VC, and NbC, while TiC is inferior in high-temperature oxidation resistance at the above-mentioned temperature but is stable up to about 400° C., above which the oxidation proceeds rapidly. Hence TiC is useful up to about 400° C.

These ceramic materials may be used in any shape, though preferably in particle or whisker shape.

The amount of these ceramic materials added is desirably from 3 to 50% by volume. Less amounts thereof than 3% by volume are little effective for improving the tenacity. Amounts thereof exceeding 50% by volume are unfit since the advantage of the low hardness of the spinel will be lost in such cases. The particle size of ceramic material is desirably up to 5 μm.

On the other hand, the main ingredient of the sintered body of this invention is a non-magnetic $MR_2O$-type oxide having spinel structure, in which M is, for example, at least one of Mg, Ni, Mn, Co and Zn and R is, for example, at least one of Al, Cr and Fe.

The tenacity improving effect of the above stated ceramic component, when the proportion of R to M in the matrix spinel represented by $MR_2O_4$ is varied, can be similarly obtained provided that the sintered body is sufficiently dense and sound.

Specific examples of the $MR_2O_4$ include $MgAl_2O_4$, $MnAl_2O_4$ and $MgCr_2O_4$. In the case of Mg-containing spinels, dense sintered bodies can be obtained so far as the content of M is 45 mole % or more as MgO. However, the MgO content exceeding 80 mole % lowers the sliding endurance since MgO tends to react with moisture and $CO_2$ in the air. In such a case, the excess of MgO is converted to $MgTiO_3$, relatively stable, by adding $TiO_2$ or the like, and then the resulting material may be used.

The sintered body of this invention can be produced in the following manner:

As stated already, the sintering should be conducted at temperatures where the spinel-type oxide and the ceramic material do not substantially react together, that is, the sintering temperature is desirably kept between 1400° and 1800° C. The sintering may be carried out under normal pressure but is preferably conducted at a pressure of 100 kg/cm² or higher in view of the integrity of sintering. The sintering can be completed without using any sintering aid, though the use of a common sintering aid such as $Li_2CO_3$ causes no trouble.

The present inventors made C.S.S. tests particularly on low-hardness materials since the C.S.S. test method is effective for the evaluation of the slide life of magnetic head sliders in "the slide in a collision mode" already stated. As a result it has been found that the tenacity at break of slider needs to be at least 25 $MN/m^{3/2}$ in terms of the $K_{IC}$ value in order to attain a slide life as long as 100K times in terms of the C.S.S. strength.

In general, sintered products having spinel structure are brittle materials which exhibit tenacities at break as low as from 1 to 2 $MN/m^{3/2}$ in terms of the $K_{IC}$ value. Therefore ceramic materials were dispersed in spinel-type oxides, as stated above, for improving the tenacity of the oxides, and as a result the sintered body of this invention has been found out. Sintered bodies as materials for magnetic recorder purposes need to exhibit tenacities at break of at least 2.5 $MN/m^{3/2}$ in terms of the $K_{IC}$ value. Sintered bodies satisfying this condition can provide the intended products superior to those of the prior art.

When TiC and $MgAl_2O_4$ are used as components of the sintered body, the proportions of TiC and $MgAl_2O_4$ are desired to be from 5 to 55% by volume and from 45 to 95% by volume, respectively, where a part of the $MgAl_2O_4$ is optionally replaced by another spinel-type oxide $XZ_2O_4$ (wherein, X denotes a divalent metal and Z denotes a trivalent metal).

TiC particles undergo surface oxidation due to the heat of friction generated during the slide with the magnetic disk and thereby their strength is lowered, but they still retain high abrasion resistance relation to that of the magnetic disk. On the other hand, the $MgAl_2O_4$ reduces the abrasion of the magnetic disk but itself tends to abrade. The slider consisting of a sintered body of this mixture can lessen the abrasion loss and damage of the magnetic disk as well as inhibit the abrasion loss and damage of the slider itself. When TiC to be mixed is replaced by $TiO_2$, the abrasion resistance of the slider is markedly lowered. From this fact it is assumed that the above effect of TiC surface oxidation is produced by the solid solution of oxygen at the surface.

Reasons for defining the TiC proportion within the range of 5 to 55% by volume are that lower TiC proportions than 5% by volume detract the abrasion resistance of the thin-film magnetic head and that higher TiC proportions than 55% by volume increase the abrasion loss of the magnetic disk.

In the case of the sintered body containing mainly of $MgAl_2O_4$, cracks formed during the processing are liable to develop through the insides of $MgAl_2O_4$ particles and hence chipping flaws tend to become equal or larger in size than $MgAl_2O_4$ particles. Accordingly, the smaller $MgAl_2O_4$ particles are the better for the purpose of reducing the size of chipping flaws to develop during the processing, the particle size of $MgAl_2O_4$ is preferably up to 5 $\mu$m. TiC particles dispersed among $MgAl_2O_4$ particles have the effect of inhibiting the grain growth of $MgAl_2O_4$. Smaller TiC particles than $MgAl_2O_4$ particles are preferable for the purpose of providing sintered bodies constructed of particles having sizes uniformly reduced under the above stated effect. Accordingly, the size of particles constructing the sintered body is desired to be small, preferably up to 5 $\mu$m.

As stated above, a part of the $MgAl_2O_4$ can be replaced by another spinel-type oxide $XZ_2O_4$, wherein X denotes a divalent metal such as Ni, Cu, Ba, Mg, Co, Mn, Ca or Zn and Z denotes a trivalent metal such as Al, Cr or Fe, with the proviso that when X is Mg, Z is not Al. In this case, mixtures of $MgAl_2O_4$, $XZ_2O_4$ and TiC can exhibit good effects as stated above so far as the volume occupied by $MgAl_2O_4$ is at least 45% of the whole volume of the spinel-type oxides.

Moreover, thermal damage inflicted on the magnetic disk is slight in this case since the thermal conductivity of the slider material ($MgAl_2O_4$-$XZ_2O_4$-TiC mixture) is higher than those of $ZrO_2$ and $BaTiO_3$. The slider, because of the non-magnetic character thereof, does not affect the recording and reproducing characteristics of the magnetic disk.

The addition of carbide, nitride, boride, silicide or other oxide with any other object does not depart from the scope of the invention provided that the spinel-type oxide(s) and TiC are main components.

As described hereinbefore, this invention provides a novel sintered body which is useful in particular as a material for magnetic recorders. This material, having good sliding properties and high tenacity or toughness, is valuable for magnetic heads and magnetic head sliders, particularly for sliders.

This invention is effective in elevating magnetic recording density and improving equipment reliability, since the invention provides thin-film, magnetic head sliders which have good sliding properties and do not inflict substantial damage on magnetic disks.

DESCRIPTION OF THE PREFERRED EMBODIMENTS OF THE INVENTION

Examples

Figure 2:
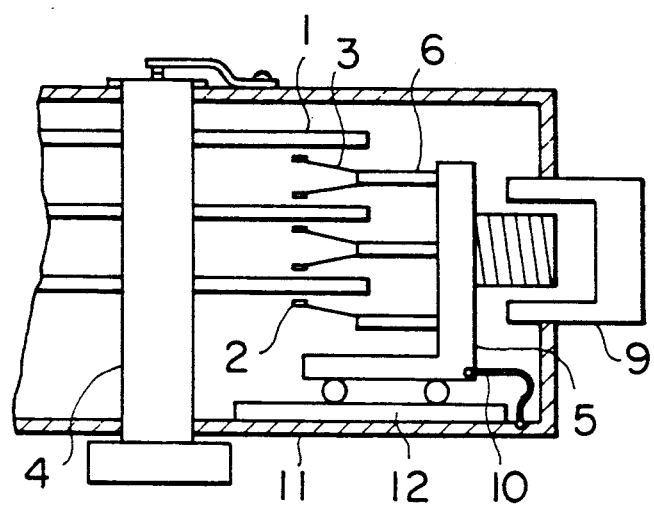
FIG. 2 is a partially sectional view of the same magnetic recorder.

FIG. 1 is a schematic partial plan view for illustrating the structure and operation of a magnetic disk recorder according to this invention. FIG. 2 is a vertically sectional view corresponding to FIG. 1. In these drawings, the meaning of numerals is as follow: 1: magnetic disk; 2: magnetic head slider; 3: spring assembly, 4: rotary shaft, 5: carriage, 6: head arm.

Structure: A number (6-12) of magnetic disks 1 are fitted each around the rotary shaft 4. On the other hand, each magnetic head slider 2 is fixed on the head arm 6 through the plate-shaped spring assembly 3 which serves to press the slider 2 against the disk 1. Each head arm is fixed on the carriage 5 which is installed to move the sliders toward the rotary shaft 4. Two head sliders 2 are fixed on each head arm 6, one of these sliders being pressed to contact with the lower side of the overlying disk and the other being pressed to contact with the upper side of the underlying disk, by the action of the plate-shaped spring assemblies.

Operation: The operation is begun with starting the revolution of disks with a motor, and upon arrival at a definite revolution, the sliders 2 pressed against the disk surfaces are detached therefrom to float by the air bearing effect. In this condition, the carriage 5 is driven to a definite position by the action of a magnetic circuit 9. The numeral 10 denotes a conductor and 11 denotes an enclosure. The carriage 5 slides on a sliding member 12.

Figure 3:
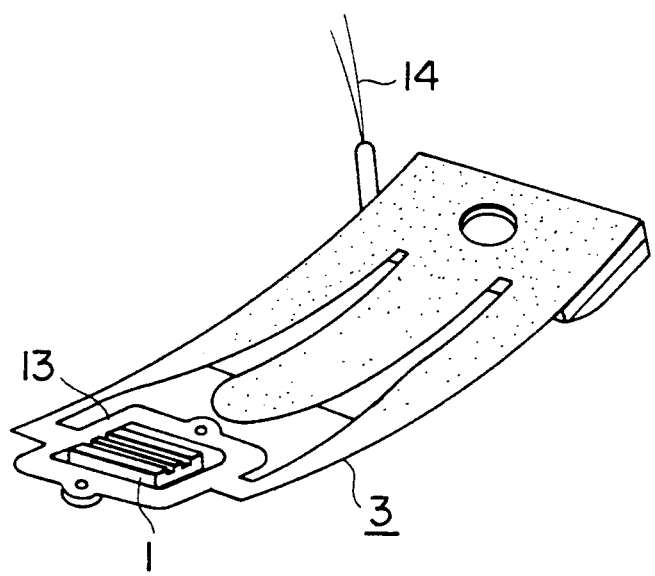
FIG. 3 is a perspective view of a winchester-type thin-film magnetic head supporting mechanism for a magnetic recorder.
Figure 4:
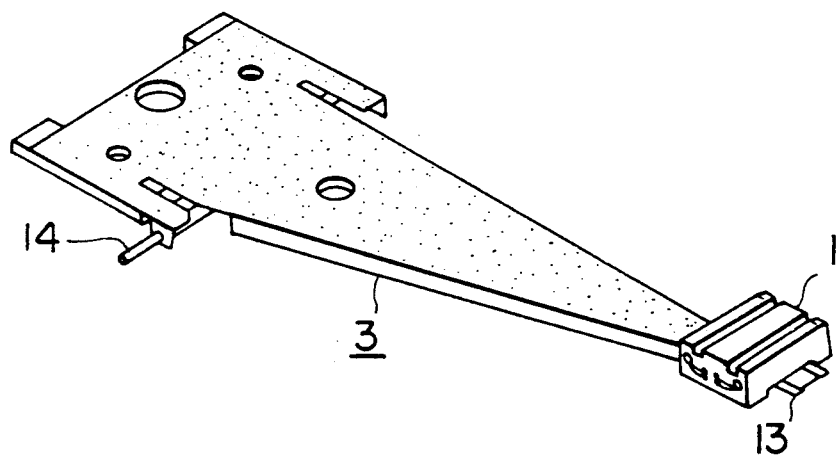
FIG. 4 is a perspective view of a Whitney-type supporting mechanism for the same purpose.

FIGS. 3 and 4 are perspective views showing the mechanism of supporting a thin-film magnetic head. FIG. 3 is for a Winchester type and FIG. 4 is for a Whitney type. Each head slider is joined to the gimbal spring 13. At the same time with the start of disk revolution, the head slider is floated by air resistance at several $\mu$m distance from the disk, thus recording or reproducing information. The numeral 14 denotes lead wires.

Figure 5:
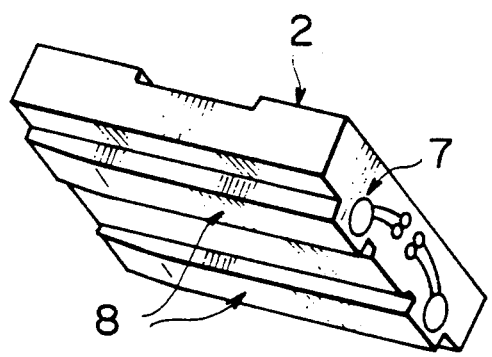
FIG. 5 is a perspective view of a magnetic head slider according to this invention.
Figure 6:
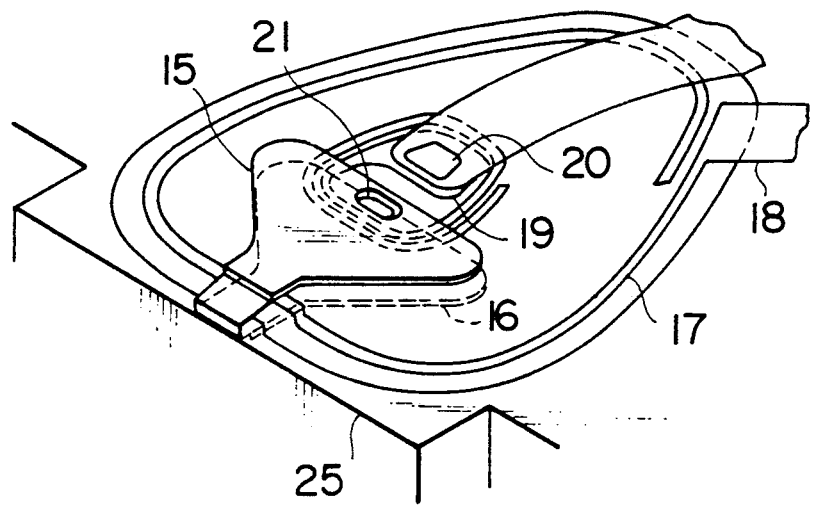
FIG. 6 is a perspective view of a thin-film magnetic head attached to the slider shown in FIG. 5.
Figure 7:
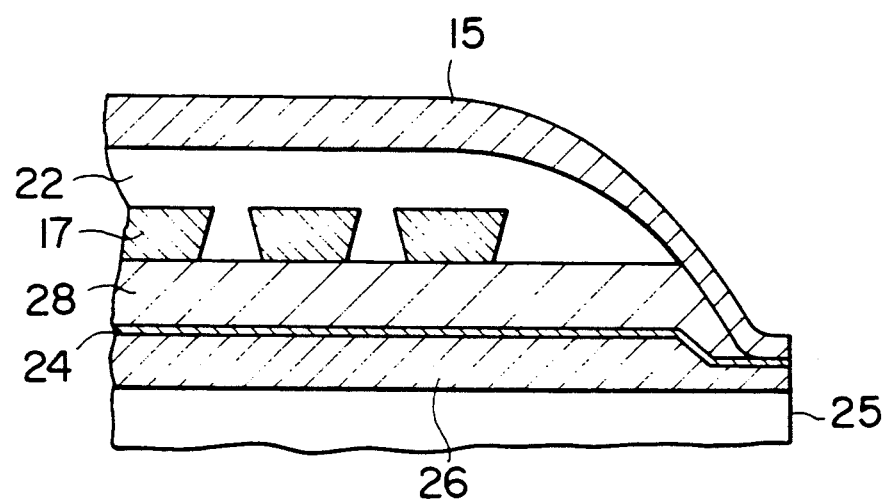
FIG. 7 is a partially sectional view of the same magnetic head.

FIG. 5 is an enlarged perspective view of each magnetic head slider. Each slider 2 consists of a sintered ceramic body provided with a slider bottom 8 and two sliding surfaces and with two magnetic head elements 7. Each magnetic head element is shown in FIGS. 6, which is a perspective plan view of the element, and in FIG. 7, which is a partially sectional view of the tip portion of the element.

Each thin-film magnetic head is constructed of an upper magnetic film 15, lower magnetic film 16, magnetic gap 24, a conductor coil 17 conductor connection 19 and back gap 21. The conductor coil 17 is insulated by insulating layers 22 and 23. The tip portion of the magnetic gap 24 between the upper and lower magnetic films is thinner than the other portion of the gap. Numerals 18 and 20 are external lead terminals of the coil 17.

Thin-film magnetic heads are formed on the sliders 2 according to a thin-film forming process.

The following Examples [I]-[VII] illustrate the fabrication of sliders and results of evaluating them.

[I]. Powders (particle size: 1-5 $\mu$m) of different spinels (purity: at least 99.0%), used as main ingredients, were mixed with powders (particle size: 1.0 $\mu$m) of different carbides (purity: at least 99.5%). The mixing ratio of the carbide to the spinel was varied as shown in Table 1. These powder mixtures were each hot-pressed, forming sintered bodies each consisting of a dispersion of carbide particles in a material having spinel structure. The sintered bodies of a dispersion of carbide particles in $MR_2O_4$ can also be produced by intermixing an MO powder, $R_2O_3$ powder, and carbide powder and hot-pressing the resulting mixture. The hot press was carried out by heating each powder mixture in vacuo up to 1650° C. while applying a pressure of 30 MPa, then maintaining the mixture as such for 1 hour, and cooling it. For comparison, sintered bodies out of the scope of the present invention were also prepared from $Al_2O_3$-

TiC mixtures (Sample Nos. 37–39), Al₂O₃-SiC mixtures (Sample Nos. 40 and 41), ZrO₂-TiC-Al₂O₃ mixture (Sample No. 42), ZrO₂-C mixture (Sample No. 43), MnZn ferrite alone (Sample No. 44), NiZn ferrite alone (Sample No. 45), and MgAl₂O₄ alone (Sample No. 46) (proportions of components were as shown in Table 1). These sintered bodies were evaluated for tenacity at break. Magnetic properties of materials shown in Table 1 were examined, with the result that these materials except MnZn ferrite and NiZn ferrite were non-magnetic.

In the next place, thin-film magnetic head sliders as shown in FIG. 5 were fabricated from the above sintered bodies. The C.S.S. strength and the retention (%) of reproduction output, as shown in Table 1, were measured on the obtained sliders in the following manners:

Concretely, first of all, information is recorded on a disk for pre-test using a recordable-reproducible thin-film magnetic head slider and at the same time reproducing output is measured.

This thin-film magnetic head slider was removed, and sliding surface of a thin-film magnetic head slider to be tested was placed on the same circumference as in advance recorded track so that the sliding surface of the slider is mounted on the signal site of the magnetic disk. When the magnetic disk is at a stop, the thin-film magnetic head is in contact with the magnetic disk. The magnetic disk was revolved to float the thin-film magnetic head and thereafter the revolution was stopped. This C.S.S. operation was repeated to slide the thin-film magnetic head repeatedly with the magnetic disk.

The retention (%) of reproduction output is expressed an intensity ratio (%) of the reproduction output immediately after recording of a given magnetic signal to the reproduction output after 100K times the C.S.S. operation. C.S.S. strength is repeated number to reach break of disk surface. Magnetic disks used in this example have coating-type recording media. Although a portion of disk surface has been broken before 100K times, an intensity ratio of reproduction output was measured observing situation of sliding surface. After measuring output reproduction at 100K times, C.S.S. test was repeated to determine C.S.S. intensity.

In Table 1, Sample Nos. 1–36 are according to this invention and Sample Nos. 37–46 are for comparison (Comparative example).

Results shown in Table 1 prove that magnetic heads according to this invention cause little decrease in the reproduction output from magnetic disks and themselves are little abraded. In comparison with these magnetic heads, C.S.S. strength of conventional magnetic head which used Al₂O₃ as a base material decreases remarkably. The surfaces of magnetic disks subjected to this test were observed, where little flaws were found at the disk tracks on which the magnetic heads according to this invention were slid and at the track on which the magnetic head formed from sintered body used ZnO₂ as a base material was slid, while heavy flaws were found at the track on which the magnetic head formed from the Al₂O₃-TiC or SiC sintered body was slid. It is assumed that the magnetic head formed from the Al₂O₃-TiC or SiC sintered body inflicted abrasion damage on the magnetic disk, resulting in such decrease in the reproduction output. The decrease in the reproduction output in the case of the magnetic head slider formed from sintered body used ZrO₂ as a base material was caused presumably by thermal damage of the sintered body. Neither such abrasion damage nor such thermal damage is caused when the magnetic head of this invention is used.

As illustrated above, the thin-film magnetic head of this invention is effective in retaining the reproduction output from magnetic disks and in inhibiting the abrasion of itself.

TABLE 1

| Sample No. | Structure | Main ingredient | Additive Type | Amount (vol %) | Tenacity at break $K_{IC}$ (MN/m$^{3/2}$) | C.S.S strength (K times) | Retention of reproduction output (%) |
|---|---|---|---|---|---|---|---|
| 1 | Spinel | MgAl₂O₄ | SiC | 1 | 1.8 | 85 | 100 |
| 2 | | | | 3 | 3.5 | 139 | 100 |
| 3 | | | | 50 | 4.0 | 101 | 99 |
| 4 | | | | 70 | 3.8 | 51 | — |
| 5 | | | VC | 1 | 2.0 | 82 | 100 |
| 6 | | | | 3 | 4.0 | 131 | 100 |
| 7 | | | | 50 | 4.2 | 108 | 99 |
| 8 | | | | 70 | 4.1 | 33 | — |
| 9 | | | ZrC | 1 | 1.6 | 62 | 100 |
| 10 | | | | 3 | 3.8 | 118 | 100 |
| 11 | | | | 50 | 3.9 | 112 | 98 |
| 12 | | | | 70 | 3.9 | 56 | — |
| 13 | | | NbC | 1 | 1.8 | 68 | 100 |
| 14 | | | | 3 | 4.0 | 120 | 100 |
| 15 | | | | 50 | 4.0 | 103 | 97 |
| 16 | | | | 70 | 4.0 | 47 | — |
| 17 | | | HfC | 1 | 2.0 | 75 | 100 |
| 18 | | | | 3 | 3.8 | 121 | 100 |
| 19 | | | | 50 | 3.9 | 111 | 97 |
| 20 | | | | 70 | 4.0 | 41 | — |
| 21 | | MnAl₂O₄ | SiC | 1 | 1.3 | 59 | — |
| 22 | | | | 3 | 3.2 | 106 | 100 |
| 23 | | | | 50 | 3.6 | 101 | 98 |
| 24 | | | | 70 | 4.2 | 31 | — |
| 25 | | | VC | 1 | 1.5 | 102 | 100 |
| 26 | | | | 3 | 3.6 | 118 | 100 |
| 27 | | | | 50 | 4.2 | 105 | 99 |
| 28 | | | | 70 | 4.2 | 37 | — |
| 29 | | MgCr₂O₄ | SiC | 1 | 1.8 | 72 | — |
| 30 | | | | 3 | 3.8 | 101 | 99 |
| 31 | | | | 50 | 4.0 | 101 | 99 |

TABLE 1-continued

| Sample No. | Structure | Main ingredient | Additive Type | Amount (vol %) | Tenacity at break $K_{IC}$ (MN/m$^{3/2}$) | C.S.S strength (K times) | Retention of reproduction output (%) |
|---|---|---|---|---|---|---|---|
| 32 | | | | 70 | 3.8 | 17 | — |
| 33 | | | VC | 1 | 1.7 | 65 | — |
| 34 | | | | 3 | 3.5 | 103 | 99 |
| 35 | | | | 50 | 4.5 | 105 | 100 |
| 36 | | | | 70 | 4.0 | 29 | — |
| 37 | Other | Al$_2$O$_3$ | TiC | 15 | 4.2 | 28 | — |
| 38 | type | | | 25 | 4.3 | 21 | — |
| 39 | | | | 35 | 4.4 | 13 | — |
| 40 | | | SiC | 25 | 4.1 | 30 | — |
| 41 | | | | 35 | 4.2 | 21 | — |
| 42 | | ZrO$_2$ | TiC, Al$_2$O$_3$, | 5, 5, | 2.0 | 141 | 61 |
| 43 | | | C | 0.5 | 1.8 | 250 | 54 |
| 44 | Spinel | MnZn ferrite | None | 0 | 1.2 | 87 | — |
| 45 | | NiZn ferrite | None | 0 | 1.4 | 72 | — |
| 46 | | MgAl$_2$O$_4$ | None | 0 | 1.7 | 91 | — |

It is evident from Table 1 that sintered bodies containing 3-50vol % of carbide additives exhibit $K_{IC}$ values of at least 3.0 MN/m$^{3/2}$ and simultaneously give C.S.S. strengths of at least 100K times. When the carbide additive content is less than 3 vol %, the $K_{IC}$ value becomes 2 MN/m$^{3/2}$ or less and the C.S.S. strength is also low. When the carbide additive content exceeds 50 vol %, the C.S.S. strength is halved. This is because the excessive amounts of carbide particles cause the spinel to lose its advantage of low hardness. In contrast, conventional slider materials composed mainly of zirconia (Sample Nos. 42 and 43), as can be seen in the comparative examples of Table 1, are excellent in C.S.S strength, but the retention of reproduction output, in the case of the ZrO$_2$-C sintered body, is as low as 54% at C.S.S. 100K times. Since recording in the disk used in this case was repeatable, the above low retention of reproduction output results presumably from the thermal demagnetization caused by the friction heat which is generated by the sliding and does not readily dissipate because of the low thermal conductivity of zirconia. On the other hand, Al$_2$O$_3$-TiC sintered bodies (Sample Nos. 37-39) and Al$_2$O$_3$-SiC sintered bodies (Sample Nos. 40 and 41), although exhibiting relatively-high tenacity at break ($K_{IC}$ value 4.1-4.4 MN/m$^{3/2}$), are remarkably inferior in the sliding property represented by the C.S.S. strength. This is because the sliders composed mainly of Al$_2$O$_3$ having a high hardness, damaged the disks during the slide. It can be concluded from the results, discussed above, that products of sintering mixtures prepared by adding particles of carbides such as SiC and VC to spinels (MR$_2$O$_4$) exhibit good sliding properties as slider materials when the amount of carbides added is in the range of 3 to 50% by volume.

Effects similar to the above were also obtained in the same tests but using plated magnetic disks which were provided with magnetic Co alloy platings covered with protective films of SiO$_2$ as well as using sputtered magnetic films which were provided with sputtered films of magnetic Co alloy or of Co-$\gamma$Fe$_2$O$_3$ covered with protective C films.

Figure 8:
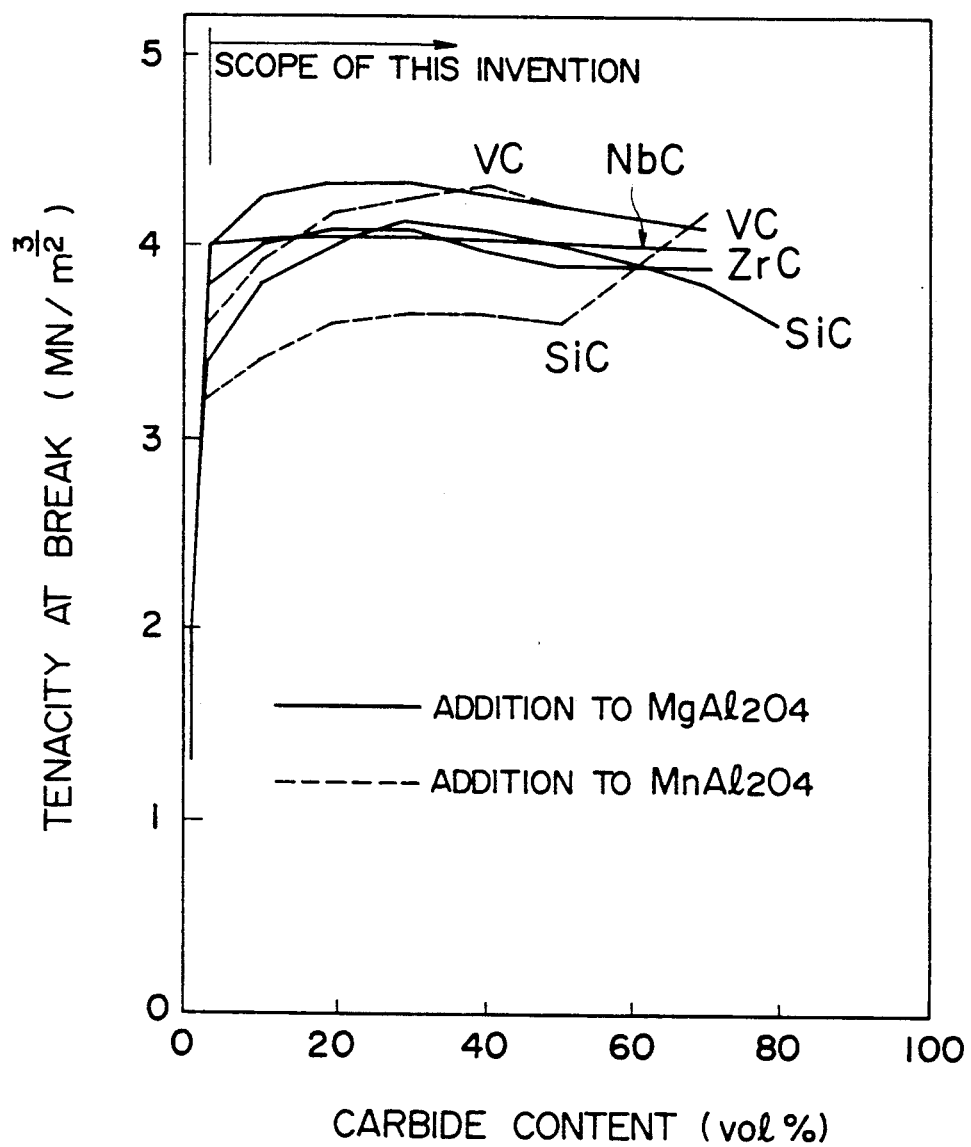
FIG. 8 is a graph showing dependencies of tenacity value at break or carbide content for various sinters.
Figure 9:
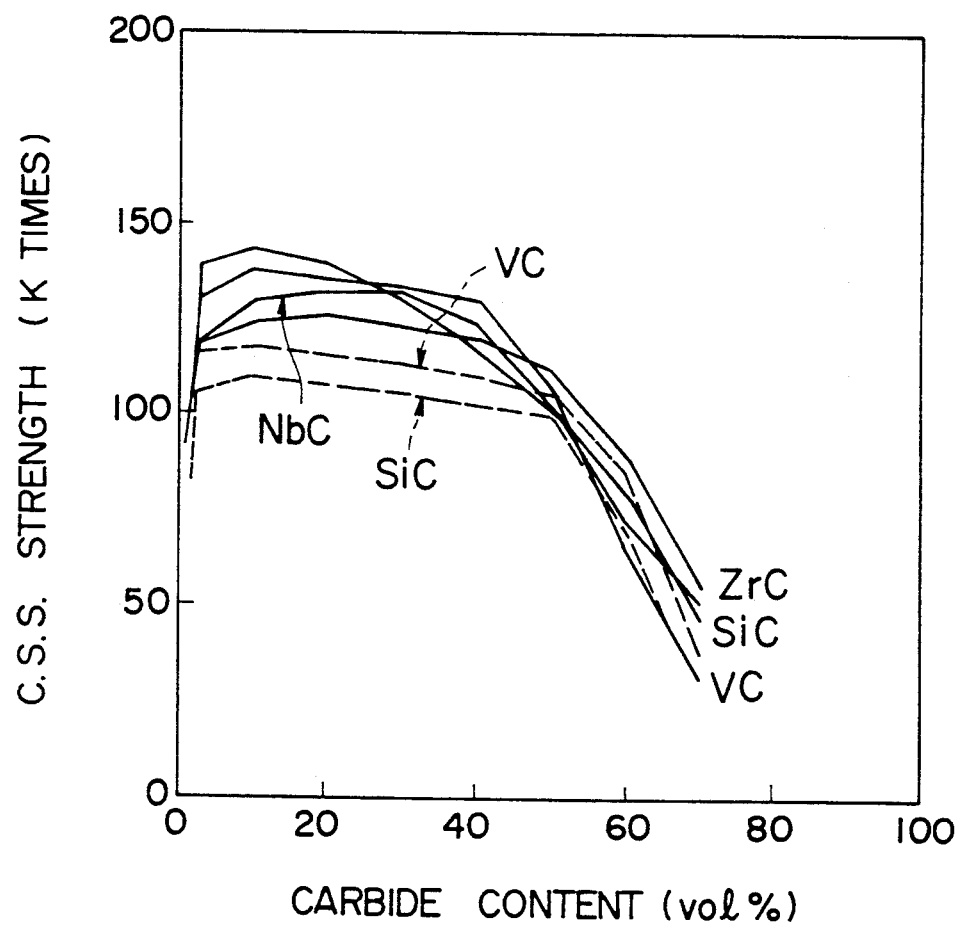
FIG. 9 is a graph showing dependencies of C.S.S. strength on carbide content for various sinters.

The above stated effects of this invention are partly shown by graphs of FIGS. 8 and 9.

FIG. 8 is a graph showing the relation between carbide content (vol %, abscissa) and tenacity at break (MN/m$^{3/2}$, ordinate) about the present inventive materials containing different carbides. FIG. 9 is a graph showing the relation between carbide content (vol %, abscissa) and C.S.S. strength (K times, ordinate) about the same materials. In both drawings, solid lines are of materials containing MgAl$_2$O$_4$ as a spinel-type oxide and broken lines are of materials containing MnAl$_2$O$_3$ as a spinel-type oxide.

[II]. Sliders were made in a manner similar to that of [I] by preparing non-magnetic compound oxides MgAl$_2$O$_4$ having spinel structure from mixtures of MgO and Al$_2$O$_3$ powders in varying proportions, and dispersing separately an SiC powder and a VC powder in the oxides MgAl$_2$O$_4$. Properties evaluated are the same as in above [I]. Magnetic disks used in these tests are of the same coating type that used in [I].

TABLE 2

| Sample No. | Additive Type | Amount (vol %) | Main ingredient | Amount oxide (mol %) MgO | Al$_2$O$_3$ | Tenacity at break $K_{IC}$ (MN/m$^{3/2}$) | C.S.S strength (K times) | Retention of reproduction output (%) |
|---|---|---|---|---|---|---|---|---|
| 47 | SiC | 30 | MgAl$_2$O$_4$ | 0 | 100 | 4.1 | 17 | — |
| 48 | | | | 30 | 70 | 4.0 | 11 | — |
| 49 | | | | 45 | 55 | 3.7 | 102 | 100 |
| 50 | | | | 50 | 50 | 4.5 | 113 | 100 |
| 51 | | | | 60 | 40 | 4.7 | 142 | 100 |
| 52 | | | | 80 | 20 | 4.1 | 101 | 98 |
| 53 | | | | 100 | 0 | 4.0 | 22 | — |
| 54 | VC | 30 | MgAl$_2$O$_4$ | 0 | 100 | 4.3 | 23 | — |
| 55 | | | | 30 | 70 | 4.1 | 13 | — |
| 56 | | | | 45 | 55 | 4.0 | 105 | 100 |
| 57 | | | | 50 | 50 | 4.9 | 123 | 100 |
| 58 | | | | 60 | 40 | 4.3 | 138 | 100 |
| 59 | | | | 80 | 20 | 4.2 | 100 | 97 |
| 60 | | | | 100 | 0 | 4.1 | 28 | — |

It proves from Table 2 that when the proportion of MgO ranges from 45 to 80 mole %, the resulting sliders have high C.S.S. strength, in other words, good sliding properties.

[III]. Sliders were made and evaluated, according to the procedure of [I] except that SiC whiskers (1 μm $\phi \times$ 5-10 μm) were added in varying proportions as shown in Table 3 to a MgOAl$_2$O$_3$ powder. Results of the evaluation are also shown in Table 3.

TABLE 3

| Sample No. | Amount of SiC whisker added (vol %) | Tenacity at break, K$_{IC}$ (MN/m$^{3/2}$) | C.S.S. strength (K times) | Retension of reproduction output (%) |
|---|---|---|---|---|
| 61 | 1 | 2.8 | 42 | 100 |
| 62 | 3 | 4.9 | 130 | 100 |
| 63 | 10 | 5.2 | 156 | 100 |
| 64 | 30 | 5.6 | 112 | 100 |
| 65 | 50 | 4.3 | 102 | 98 |
| 66 | 70 | 3.1 | 51 | — |

It can be seen from Table 3 that a high tenacity slider exhibiting a K$_{IC}$ value of 4.9 MN/m$^{3/2}$ can be obtained by adding 3 vol % of SiC whiskers and as the amount of whiskers is further increased, the tenacity tends to increase gradually.

Moreover, results shown in Table 3 reveal that enhancing the tenacity by the addition of whiskers brings about simultaneously increased C.S.S. strength, i.e. improved sliding properties.

[IV]. Mixtures of Al$_2$O$_3$, MgO, and TiC powders (containing or not containing other oxides) in varying proportions as shown in Table 4 were ball-milled separately in acetone for 50-100 hours to give uniform slurries free of coarse particles. Each slurry was dried up with stirring and the resulting powder was put into a mold and shaped while applying pressure. Molded bodies of different compositions were hot press sintered each in vacuo at 1650° C. for 1 hour, where the hot press pressure was 400 kgf/cm$^2$. The surfaces of thus sintered bodies were mirror-finished to a maximum roughness of 0.1 μm by machine cutting polishing, thereby making up substrates for thin-film magnetic heads.

Parts of these substrates were cut off and etched to examine their particle sizes. Surfaces subjected to etching were observed through a scanning electron microscope and average particle sizes were measured by the intercept method. Results of the measurement are shown in Table 4. All the samples of different compositions were found to have fine average particle sizes up to 5 μm. Further, the crystal structure of each sintered body was examined by X-ray diffraction, from which all the sintered bodies according to this invention were found to mixtures of spinel conpounds with TiC crystals. Examination of magnetism proved that all of these sintered bodies are non-magnetic.

One side of each substrate was overlaid successively with an insulator film, conductor film, and magnetic alloy film in predetermined shapes and sizes. Each sintered body on which a thin-film magnetic head element was thus mounted was machined to fabricate a thin-film magnetic head shown in FIG. 5. All the sintered bodies according to this invention on this machining were only slightly chipped, exhibiting good machine processability. The following slide test was conducted on these thin-film magnetic heads. Magnetic disks used in this test were of a coating type made by applying a kneaded mixture of a magnetic γ-Fe$_2$O$_3$ powder, reinforcing Al$_2$O$_3$ powder, and epoxy resin on an Al alloy plate. The test procedure was as follows: First, a definite signal was recorded on said magnetic disk by using a standard thin-film magnetic head. Secondly, a C.S.S. test of 10K times as stated before was conducted by using a thin-film magnetic head to be tested. Thereafter, the signal recorded first was reproduced by using again the standard thin-film magnetic head in place of the test head, where the reproduction output was measured. The ratio of the reproduction output measured after said C.S.S. test to the output measured before this test was determined as retention of reproduction output. Abrasion depth at the surface where the thin-film magnetic head element was formed was also measured by using a microscope. Abrasion depth was also measured on a reference head which was made by using a slider material composed of Al$_2$O$_3$ and 30 vol % TiC. The magnetic head abrasion ratio is defined as the ratio of the abrasion depth measured on the test head to that measured on the reference head. Results of these evaluations are shown in Table 4.

TABLE 4

| No. | Composition | Sintering temperature (°C.) | Crystal phases in sintered body | Particle size μm | Retention of reproduction output % | Magnetic head abrasion ratio | Note |
|---|---|---|---|---|---|---|---|
| 67 | (Al$_2$O$_3$.50 mol % MgO)—10 vol % TiC | 1650 | Spinel, TiC | 3.3 | 100 | 1.2 | Present invention |
| 68 | (Al$_2$O$_3$.50 mol % MgO)—30 vol % TiC | 1650 | Spinel, TiC | 2.0 | 100 | 1.1 | Present invention |
| 69 | (Al$_2$O$_3$.50 mol % MgO)—50 vol % TiC | 1650 | Spinel, TiC | 1.3 | 98 | 1.0 | Present invention |
| 70 | (Al$_2$O$_3$.50 mol % MgO)—10 vol % (Al$_2$O$_3$—50 mol % NiO) | 1650 | Spinel, TiC | 2.1 | 100 | 1.1 | Present invention |
| 71 | (Al$_2$O$_3$.50 mol % MgO)—30 vol % TiC (Al$_2$O$_3$.50 mol % MgO)—30 vol % (Al$_2$O$_3$—50 mol % NiO) | 1650 | Spinel, TiC | 3.4 | 100 | 1.2 | Present invention |
| 72 | (Al$_2$O$_3$.50 mol % MgO)—10 vol % TiC (Al$_2$O$_3$.50 mol % MgO)—10 vol % (Al$_2$O$_3$—50 mol % ZnO) | 1650 | Spinel, TiC | 2.0 | 100 | 1.1 | Present invention |
| 73 | (Al$_2$O$_3$.50 mol % MgO)—30 vol % TiC (Al$_2$O$_3$.50 mol % MgO)—30 vol % (Al$_2$O$_3$—50 mol % ZnO) | 1650 | Spinel, TiC | 3.2 | 100 | 1.2 | Present invention |
| 74 | (Al$_2$O$_3$.50 mol % MgO)—10 vol % TiC (Al$_2$O$_3$.50 mol % MgO)—10 vol % (Al$_2$O$_3$—50 mol % CoO) | 1650 | Spinel, TiC | 2.3 | 100 | 1.1 | Present invention |
| 75 | (Al$_2$O$_3$.50 mol % MgO)—30 vol % TiC (Al$_2$O$_3$.50 mol % MgO)—30 vol % | 1650 | Spinel, TiC | 3.1 | 100 | 1.2 | Present |

TABLE 4-continued

| No. | Slider material Composition | Sintering temperature (°C.) | Crystal phases in sintered body | Particle size μm | Retention of reproduction output % | Magnetic head abrasion ratio | Note |
|---|---|---|---|---|---|---|---|
|  | (Al₂O₃—50 mol % CoO) |  |  |  |  |  | invention |
|  | (Al₂O₃.50 mol % MgO)—10 vol % TiC |  |  |  |  |  |  |
| 76 | (Al₂O₃.50 mol % MgO)—10 vol % (Al₂O₃—50 mol % MnO) | 1650 | Spinel, TiC | 2.1 | 100 | 1.1 | Present invention |
|  | (Al₂O₃.50 mol % MgO)—30 vol % TiC |  |  |  |  |  |  |
| 77 | (Al₂O₃.50 mol % MgO)—30 vol % (Al₂O₃—50 mol % MnO) | 1650 | Spinel, TiC | 3.3 | 100 | 1.2 | Present invention |
|  | (Al₂O₃.50 mol % MgO)—10 vol % TiC |  |  |  |  |  |  |
| 78 | (Al₂O₃.50 mol % MgO)—10 vol % (Cr₂O₃—50 mol % MgO) | 1650 | Spinel, TiC | 2.0 | 100 | 1.1 | Present invention |
|  | (Al₂O₃.50 mol % MgO)—30 vol % TiC |  |  |  |  |  |  |
| 79 | (Al₂O₃.50 mol % MgO)—30 vol % (Cr₂O₃—50 mol % MgO) | 1650 | Spinel, TiC | 3.9 | 100 | 1.2 | Present invention |
|  | (Al₂O₃.50 mol % MgO)—10 vol % TiC |  |  |  |  |  |  |
| 80 | (Al₂O₃.50 mol % MgO)—10 vol % (Cr₂O₃—50 mol % NiO) | 1650 | Spinel, TiC | 1.9 | 100 | 1.1 | Present invention |
|  | (Al₂O₃.50 mol % MgO)—30 vol % TiC |  |  |  |  |  |  |
| 81 | (Al₂O₃.50 mol % MgO)—30 vol % (Cr₂O₃—50 mol % NiO) | 1650 | Spinel, TiC | 3.0 | 100 | 1.2 | Present invention |
|  | (Al₂O₃.50 mol % MgO)—10 vol % TiC |  |  |  |  |  |  |
| 82 | (Al₂O₃.50 mol % MgO)—10 vol % (Cr₂O₃—50 mol % ZnO) | 1650 | Spinel, TiC | 1.9 | 100 | 1.2 | Present invention |
|  | (Al₂O₃.50 mol % MgO)—30 vol % TiC |  |  |  |  |  |  |
| 83 | (Al₂O₃.50 mol % MgO)—30 vol % (Cr₂O₃—50 mol % ZnO) | 1650 | Spinel, TiC | 3.3 | 100 | 1.1 | Present invention |
|  | (Al₂O₃.50 mol % MgO)—10 vol % TiC |  |  |  |  |  |  |
| 84 | (Al₂O₃.50 mol % MgO)—10 vol % (Cr₂O₃—50 mol % CoO) | 1650 | Spinel, TiC | 2.0 | 100 | 1.2 | Present invention |
|  | (Al₂O₃.50 mol % MgO)—30 vol % TiC |  |  |  |  |  |  |
| 85 | (Al₂O₃.50 mol % MgO)—30 vol % (Cr₂O₃—50 mol % CoO) | 1650 | Spinel, TiC | 3.2 | 100 | 1.2 | Present invention |
|  | (Al₂O₃.50 mol % MgO)—10 vol % TiC |  |  |  |  |  |  |
| 86 | (Al₂O₃.50 mol % MgO)—10 vol % (Cr₂O₃—50 mol % MnO) | 1650 | Spinel, TiC | 2.3 | 100 | 1.1 | Present invention |
|  | (Al₂O₃.50 mol % MgO)—30 vol % TiC |  |  |  |  |  |  |
| 87 | (Al₂O₃.50 mol % MgO)—30 vol % (Cr₂O₃—50 mol % MnO) | 1650 | Spinel, TiC | 3.1 | 100 | 1.2 | Present invention |
|  | (Al₂O₃.50 mol % MgO)—10 vol % TiC |  |  |  |  |  |  |
| 88 | Al₂O₃—30 vol % TiC | 1650 | Al₂O₃, TiC | 1.6 | 74 | 1 | Comparative example |
| 89 | (TiO2—50 molT Ba)—30 vol % TiC | 1650 | BaTiO₃, TiC | 2.3 | 86 | 2.8 | Comparative example |

[V]. To examine the effect of TiC content, the following test was conducted. First, base plates (substrates) were formed from raw material powder mixtures of varying compositions as shown in Table 5 according to the procedure of [IV], wherein the sintering was carried out at 1650° C. The crystal structure and particle size of the formed base plates were examined by the same methods. Results of these examinations are shown in Table 5. From the data in Table 5, it is seen that particles grow to large sizes in the sintered bodies containing less TiC than 5 vol %. Grooves of 1-mm depth were cut in one side of each base plate by using a diamond cutter of #1500, 52 mm diameter, and 0.27 mm thickness. Sizes of chipping flaws formed at edge portions of the grooves during this cutting were observed through a microscope to measure the largest flaw size per base plates of the same composition. The result, as shown in Table 5, revealed that chipping flaws were small when the particle size was up to 5 μm (TiC content: at least 5 vol %). Nearly the same effect was obtained when the particle size was varied by varying the sintering temperature with the TiC content maintained constant.

Subsequently, thin-film magnetic heads were made according to the procedure of [IV] and subjected to a test of sliding on coating-type magnetic disks by the same method. Results of this test are shown in Table 5.

TABLE 5

| No. | Slider material Composition | Crystal phase | Particle size (μm) | Size of chipping flaw formed during cutting (μm) | Retention of reproduction output % | Magnetic head abrasion ratio | Note |
|---|---|---|---|---|---|---|---|
| 90 | (Al₂O₃—50 mol % MgO) | Spinel | 34.2 | 48 | 100 | 2.4 | Comparative example |
| 91 | (Al₂O₃—50 mol % MgO)—Al₂O₃—2 vol % TiC | Spinel, TiC | 13.1 | 15 | 100 | 2.0 | Comparative example |
| 92 | (Al₂O₃—50 mol % MgO)—Al₂O₃—5 vol % TiC | Spinel, TiC | 4.9 | 5 | 100 | 1.2 | Present invention |
| 93 | (Al₂O₃—50 mol % MgO)—Al₂O₃—35 vol % TiC | Spinel, TiC | 2.0 | 3 | 100 | 1.1 | Present |

TABLE 5-continued

| No. | Slider material Composition | Crystal phase | Particle size (μm) | Size of chipping flaw formed during cutting (μm) | Retention of reproduction output % | Magnetic head abrasion ratio | Note |
|---|---|---|---|---|---|---|---|
| 94 | (Al$_2$O$_3$—50 mol % MgO)—Al$_2$O$_3$—55 vol % TiC | Spinel, TiC | 1.3 | 2 | 96 | 1.0 | invention Present invention |
| 95 | (Al$_2$O$_3$—50 mol % MgO)—Al$_2$O$_3$—70 Vol % TiC | Spinel, TiC | 1.0 | 2 | 79 | 1.0 | Comparative example |
| 88 | Al$_2$O$_3$—30 vol % TiC | Al$_2$O$_3$, TiC | 1.6 | 3 | 74 | 1 | Comparative example |

It can be seen from Table 5 that when the TiC content is less than 5 vol %, the thin-film magnetic head undergoes heavy abrasion and when the content exceeds 55 vol %, the reproduction output drops remarkably. Many flaws were observed in the slide surfaces of heads which effected remarkable drops in the reproduction output. Accordingly, it is assumed that sliders containing more TiC than 55 vol % chip magnetic disks, lowering the reproduction output.

According to results of examples given above, magnetic head sliders of this invention, containing 5–55 vol % of TiC, are effective in retaining the reproduction output from magnetic disks and lessening the abrasion of themselves.

Similar effects were obtained upon a partial replacement of Mg in MgAl$_2$O$_4$ by each of other divalent metals Ni, Zn, Co, Mn, Cu, Ba and Ca and a partial replacement of Al by each of Cr and Fe, so far as the proportion of MgAl$_2$O$_4$ was at least 45 vol %.

[VI]. The following test was conducted to examine the influence of replacing a part of MgAl$_2$O$_4$ by another oxide having spinel structure. First, base plates were formed from raw material powder mixtures of varying compositions as shown in Table 6 according to the procedure of [IV], wherein the sintering was carried out at 1650° C. Using these base plates, thin-film magnetic heads were made and subjected to a test of sliding on magnetic disks by the same method. Results of this test are shown in Table 6.

Many flaws were observed in the slide surfaces of magnetic heads which effected drops in the reproduction output.

In case that a proportion of oxide having a spinel structure containing MgAl$_2$O$_4$ is less than 45%, reproduction output decreases or abrasion of slider becomes large.

Results similar to some of those stated above was obtained upon partial replacement of MgAl$_2$O$_4$ by a spienl-type oxide which is a combination, different from the combination of MgO with Al$_2$O$_3$, of the oxide of a divalent metal such as Mg, Ni, Zn, Co, Mn, Cu, Ba or Ca with the oxide of a trivalent metal such as Ar, Cr or Fe.

[VII]. A slide test was conducted on sintered bodies shown in Table 4 by using magnetic disks of a sputter type which was made by forming a substrate layer of NiP and Cr on an Al alloy plate, forming a magnetic CoNi alloy film on the substrate layer by sputtering, and further forming a protective film of C on the CoNi alloy film. Results of this test are shown in Table 7.

TABLE 7

| No. | Retention reproduction output (%) | Magnetic head abrasion ratio | No. | Retention reproduction output (%) | Magnetic head abrasion ratio |
|---|---|---|---|---|---|
| 67 | 100 | 1.2 | 79 | 100 | 1.2 |
| 68 | 100 | 1.1 | 80 | 100 | 1.1 |
| 69 | 98 | 1.0 | 81 | 100 | 1.2 |
| 70 | 100 | 1.1 | 82 | 100 | 1.1 |
| 71 | 100 | 1.2 | 83 | 100 | 1.2 |
| 72 | 100 | 1.1 | 84 | 100 | 1.1 |
| 73 | 100 | 1.2 | 85 | 100 | 1.2 |
| 74 | 100 | 1.1 | 86 | 100 | 1.1 |
| 75 | 100 | 1.2 | 87 | 100 | 1.2 |
| 76 | 100 | 1.1 | 88 | 71 | 1 |

TABLE 6

| No. | Slider material Composition | Crystal phase | Particle size (μm) | Retention of reproduction output % | Magnetic head abrasion ratio | Note |
|---|---|---|---|---|---|---|
| 92 | MgAl$_2$O$_4$—5 vol % TiC | Spinel, TiC | 4.9 | 100 | 1.2 | Present invention |
| 96 | MgAl$_2$O$_4$—50 vol % MgCr$_2$O$_4$ MgAl$_2$O$_4$—5 vol % TiC | Spinel, TiC | 4.7 | 96 | 1.2 | Present invention |
| 97 | MgAl$_2$O$_4$—65 vol % MgCr$_2$O$_4$ MgAl$_2$O$_4$—5 vol % TiC | Spinel, TiC | 4.8 | 85 | 1.1 | Comparative example |
| 68 | MgAl$_2$O$_4$—30 vol % TiC | Spinel, TiC | 2.0 | 100 | 1.1 | Present invention |
| 98 | MgAl$_2$O$_4$—35 vol % MnAl$_2$O$_4$ MgAl$_2$O$_4$—30 vol % TiC | Spinel, TiC | 2.2 | 100 | 1.2 | Present invention |
| 99 | MgAl$_2$O$_4$—50 vol % MnAl$_2$O$_4$ MgAl$_2$O$_4$—30 vol % TiC | Spinel, TiC | 2.3 | 100 | 1.9 | Comparative example |
| 88 | Al$_2$O$_3$—30 vol % TiC | Al$_2$O$_3$, TiC | 1.6 | 74 | 1 | Comparative example |

It can be seen from Table 6 that when the proportion by volume of MgAl$_2$O$_4$ is less than 45%, the reproduction output from magnetic disks drops largely (Sample No. 31) or the magnetic head is much abraded (Sample No. 33).

TABLE 7-continued

| No. | Retention reproduction output (%) | Magnetic head abrasion ratio | No. | Retention reproduction output (%) | Magnetic head abrasion ratio |
|---|---|---|---|---|---|
| 77 | 100 | 1.2 | 89 | 83 | 2.6 |
| 78 | 100 | 1.1 | | | |

It can be seen from Table 7 that magnetic heads Nos. 67–87 of this invention cause little drop in the reproduction output from sputter-type magnetic disks and themselves undergo little abrasion.

That is, according to these examples, thin-film magnetic heads of this invention are effective in retaining the reproduction output from sputter-type magnetic disks and inhibiting abrasion of themselves. Similar effects were obtained, upon using test magnetic disks of a plating-type which were made by forming protective films of $SiO_2$ on plating films of magnetic Co alloy as well as using test magnetic disks of a sputter type which were made by forming protective films of C on magnetic $Co$-$\gamma$-$Fe_2O_3$ sputter films.

The following description is of a process for making thin-film magnetic disks according to this invention.

As shown in FIG. 6, a number of thin-film magnetic heads on a ceramic wafer consisting of the above described sintered body of this invention, and individual heads are obtained by cutting the wafer. A non-magnetic substrate 25 consisting of said sintered body, which also serves as a slider, is overlaid with a predetermined pattern of lower magnetic layer 16 consisting of Permalloy (Ni-Fe) by the conventional process and then with a gap layer 24 (see FIG. 7) of silicon dioxide or the like by plating or sputtering and by the photolithographic technique or the like. Then a predetermined pattern of upper magnetic layer 15 consisting of Permalloy (Ni-Fe) or the like of a definite thickness is applied on that region of said gap layer 24 where a gap is intended to form, and this magnetic layer is made up to a predetermined pattern. Then the other region of said gap layer 24 is overlaid successively with a coil conductor layer 17 consisting of a conductor such as Cu, through an insulating layer 15 consisting of a cured resin film, and with an insulating layer 22 consisting of the same material as used for said insulating layer 23. Further, said insulating layers 22 and 23 are made up simultaneously to predetermined patterns as shown in FIG. 6. Thereafter the second upper magnetic layer consisting of Permalloy (Ni-Fe) is formed by sputtering or the like on said insulating layer 22 and on a part of the first upper magnetic layer 15, and this second upper magnetic layer is made up to a predetermined pattern by the photolithographic technique.

As stated above, a portion of the first upper magnetic layer 15, said portion corresponding to the front end of the magnetic pole and hence being required to have highly accurate dimensions, is formed separately prior to the formation of the second upper magnetic layer, whereby it has become possible to form the thickness and pattern width of the magnetic pole front end portion of the first upper magnetic layer 15 with a close tolerance of $\pm 1$ $\mu$m without being affected by the level difference between this layer and the coil conductor layer 17. Thus, it is possible to fabricate thin-film magnetic heads exhibiting high efficiency of recording and reproduction. In addition, these thin-film magnetic heads are superior in abrasion resistance.

What is claimed is:

1. A magnetic disk recorder equipped with (i) magnetic disks having magnetic recording media, (ii) thin-film magnetic heads for recording information on said magnetic recording media and reproducing information therefrom, and (iii) a carriage for moving said magnetic heads to intended positions, wherein said thin-film magnetic heads are formed on sliders made of sintered ceramic bodies consisting essentially of a non-magnetic metal oxide of spinel structure and 3 to 50% by volume of ceramic particles which are harder than the metal oxide and which are dispersed in the oxide.

2. A magnetic disk recorder equipped with (i) magnetic disks having magnetic recording media, (ii) thin-film magnetic heads for recording information on said magnetic recording media and reproducing information therefrom, and (iii) a carriage for moving said magnetic heads to intended positions, wherein said thin-film magnetic heads are formed on sliders made of sintered ceramic bodies consisting essentially of a non-magnetic metal oxide of spinel structure and 3 to 50% by volume of particles of non-oxide type metal compound dispersed in the metal oxide, said particles being not substantially oxidized at service temperatures.

3. A magnetic disk recorder equipped with (i) magnetic disks having magnetic recording media, (ii) thin-film magnetic heads for recording information on said magnetic recording media and reproducing information therefrom, and (iii) a carriage for moving said magnetic heads to intended positions, wherein said thin-film magnetic heads are formed on sliders made of sintered ceramic bodies consisting essentially of a non-magnetic metal oxide of spinel structure represented by $MR_2O_4$, wherein M denotes a divalent metal and R denotes a trivalent metal, and 3 to 50% by volume of particles of non-oxide type metal compound dispersed in the metal oxide, said particles being higher in Young's modulus than the metal oxide and not substantially oxidized at service temperatures.

4. A magnetic disk recorder equipped with (i) magnetic disks having magnetic recording media, (ii) thin-film magnetic heads for recording information on said magnetic recording media and reproducing information therefrom, and (iii) a carriage for moving said magnetic heads to intended positions, wherein said thin-film magnetic heads are formed on sliders made of sintered ceramic bodies consisting essentially of a non-magnetic metal oxide of spinel structure and 3 to 50% by volume of particles of non-oxide type ceramic particles dispersed in the metal oxide which are harder than the metal oxide and not substantially oxidized at service temperatures.

5. A magnetic disk recorder equipped with (i) magnetic disks having magnetic recording media, (ii) thin-film magnetic heads for recording information on said magnetic recording media and reproducing information therefrom, and (iii) a carriage for moving said magnetic heads to intended positions, wherein said thin-film magnetic heads are formed on sliders of a ceramic material consisting essentially of (a) spinel-structured oxide represented by $MR_2O_4$, wherein M is at least one metal selected from Ca, Cu, Ba, Mg, Ni, Mn, Co and Zn and R is at least one metal selected from Al, Cr and Fe and (b) 3 to 50% by volume of particles and/or whiskers of at least one of SiC, ZrC, HfC, VC, NbC and TiC, said particles and/or whiskers being dispersed in the oxide.

* * * * *